United States Patent [19]

Endoh

[11] Patent Number: 5,520,569
[45] Date of Patent: May 28, 1996

[54] CUTTER AND A ROTARY CUTTER APPARATUS

[75] Inventor: Shigeru Endoh, Kasukabe, Japan

[73] Assignees: Get Inc., Ibaraki-ken; Shonan Gosei-Jushi Seisakusyo K.K., Kanagawa-ken, both of Japan

[21] Appl. No.: 194,595

[22] Filed: Feb. 10, 1994

[30] Foreign Application Priority Data

Feb. 22, 1993 [JP] Japan ................................. 5-031545

[51] Int. Cl.$^6$ ................................................. B24B 49/12
[52] U.S. Cl. ........................... 451/5; 451/6; 451/70; 451/71; 408/27; 7/158
[58] Field of Search .............................. 451/5, 6, 69, 70, 451/71, 461, 462, 540, 541; 15/104.02, 104.05, 104.09, 104.13; 408/16, 22, 24, 26, 27, 70; 409/143; 7/157, 158; 166/55, 55.2

[56] References Cited

U.S. PATENT DOCUMENTS

| | | | |
|---|---|---|---|
| 4,197,908 | 4/1980 | Davis et al. | 409/143 |
| 5,105,882 | 4/1992 | Ralston et al. | 409/143 |

FOREIGN PATENT DOCUMENTS

| | | | |
|---|---|---|---|
| 60-242038 | 12/1985 | Japan . | |
| 3256303 | 10/1988 | Japan | 409/143 |
| 58407 | 3/1989 | Japan | 409/143 |
| 15909 | 1/1990 | Japan | 409/143 |
| 03450 | 10/1983 | WIPO | 409/143 |
| 07919 | 10/1988 | WIPO | 409/143 |

*Primary Examiner*—Maurina T. Rachuba
*Attorney, Agent, or Firm*—Lowe, Price, LeBlanc & Becker

[57] ABSTRACT

A cutter apparatus comprising an on-the-sleigh robot, a motor having a vertical output shaft and capable of shifting vertically, a rotary cutter detachably connected at the end of the output shaft of the motor, and a cordless TV camera installed on the robot. In particular, the rotary cutter has a disk-shaped support plate, whose side surface is abrasive, upper and lower disks parallel to each other, which are arranged in a row in axial direction to sandwich the support plate inbetween and whose exposed faces, respectively, are abrasive, a tapered reamer extending axially upward from the center of the upper disk, and a binder assembly to bind the tapered reamer, the upper and lower disks, and the support plate together and to fix the rotary cutter about an output shaft of the motor.

10 Claims, 10 Drawing Sheets

5,520,569

CUTTER AND A ROTARY CUTTER APPARATUS

TECHNICAL FIELD

The present invention relates to a rotary cutter and a cutting apparatus equipped with the rotary cutter which can be used conveniently and effectively in a pipe line repair operation wherein a lining material is applied to the inner wall of the pipe which has a second pipe branching thereoff. The cutter apparatus of the present invention has the rotary cutter which can be shifted vertically, and can cut with its side surface as well as its top and bottom surfaces.

BACKGROUND ART

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of insertion shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

When, however, the pipe has a second pipe branching out from it, it is necessary to cut off that portion of the liner which closes the branch pipe. To do so, as shown in FIG. 13, a cutter apparatus having a hole saw type cutter 101 having a diameter corresponding to the size of the branch pipe is conventionally employed, which is brought in the main pipe 115 and operated to bore and cut open the liner 117 at the branch pipe 116. Alternatively, a cutter apparatus having a conical grinding cutter 201, as shown in FIG. 14, is used.

Now, as shown in FIG. 13, which is a vertical sectional view of a sewerage site, the branch pipe 116 is usually tilted in a manner such that the flow of the liquid down the branch pipe 116 acquires a momentum to rush downstream when it enters the main pipe 115. In other words, when the downstream of the main pipe 115 is to the left, the angle $\theta$ is substantially smaller than 90 degrees. As a result, the end hole of the branch pipe 116 to open into the main pipe 115 has a shape of ellipse rather than a circle, as shown in FIG. 15. Therefore, when the liner 117 is cut open by a hole saw type cutter 101 or by a conical grinding cutter 201, the hole 117a cut open is circular and two burrs 117b of crescent shape (hatched in FIG. 15) are left about the hole 117a to constrict the passage. And the size of the burrs 117b will be greater when the center of the cutter is not suitably positioned with respect to the position of the branch pipe 116.

Furthermore, when the diameter d of the branch pipe 116 is relatively large, a cutter 101 (or 201) is selected which has a comparatively large diameter D, and when the diameter $D_1$ of the main pipe 115 is not by far larger than the cutter 101, the combined vertical length of the cutter 101 and the motor 123 becomes so great that it is difficult to enter and transport the cutter apparatus into the main pipe without the cutter touching the wall of the main pipe 115; and in this case, the operator who remote-control the cutter 101 must be an experienced skillful one able to accurately move the cutter since the cutter 101 is not allowed to have a large vertical stroke.

Also, as shown in FIG. 14, when the thermosetting resin that has oozed out from the tubular liner 117 gathers and forms a resin pool 130, the cutting operation becomes difficult because the increased friction lowers the cutting speed, and clogging of the saw teeth with the resin decreases the cutting efficiency of the cutter.

In consideration of these problems, there has been contrived a method wherein, as shown in FIG. 16, a thin rod-shaped rotary cutter 301 is used to first puncture the liner at a location close to the inner wall of the branch pipe, and then to move the spinning cutter 301 along the inner edge of the branch pipe 116 to cut open the circular hole (in fact elliptical). However, in practice it is difficult to move the thin rod-shaped rotary cutter 301 to describe a circle or ellipse for such a cutter is so poor in rigidity that it twists and vibrates a good deal and as the result the cutter does not make a clear cut line even when it is monitored by a TV camera 121.

Also, it is possible to adopt a disc-shaped grindstone 401, as shown in FIG. 17, to grind through the liner; however, a locking means 114 such as a nut is necessarily provided on top of the grindstone 401 to lock the grindstone 401 about the rotary shaft 113, and this means 114 gets in the way and prevents grindstone from opening the hole.

Another problem with a conventional cutter is that when it is so worn that its service life is over, it is necessary to entirely replace it with a new one, which is a very costly practice.

Incidentally, the hole making operation on the tubular liner 11, shown in FIG. 13, is conducted by means of a robot 120 (cutter apparatus), whose movement is remote-controlled through monitoring by a TV camera 121 introduced in the main pipe 115.

However, a problem with this system is that the cord 127 connected to the TV camera 121 and the cord 129 connected to the robot 120 tend to get in the way and prevent the TV camera 121 and the robot 120 from moving smoothly.

DISCLOSURE OF THE INVENTION

An object of the invention is to provide a cutter which is capable of cutting vertically as well as laterally, and which is capable of being operated easily and precisely as it cuts off and punctures the liner, and which also is constructed such that parts replacement can be done easily and economically.

It is also an object of the invention to provide a cutter apparatus which can do away with the cords for the monitor TV camera and the robot so that operation efficiency is improved.

In order to attain the above and other objects of the invention, there is provided a rotary cutter having an axis of rotation and comprising a disk-shaped support plate, whose side surface is abrasive, upper and lower disks parallel to each other, which are arranged in a row in axial direction to sandwich said support plate inbetween and whose exposed faces, respectively, are abrasive, a tapered drill means extending axially upward from the center of the upper disk, and a binder assembly (8, 9, 14) to bind said tapered drill means, said upper and lower disks, and said support plate together and detachably and to fix said rotary cutter about an output shaft of a rotary drive means also detachably.

Furthermore, the invention provides a cutter apparatus equipped with a rotary cutter such as described above, which apparatus further comprises an on-the-sleigh robot, a drive means having a vertical output shaft and capable of shifting vertically relative to said robot, and a cordless TV camera installed on said robot; the rotary cutter is detachably connected at the end of said output shaft of the drive means,.

The cordless TV camera preferably includes a camera, transmitter, a light, a battery, and antenna.

According to the invention, the tapered drill means extends axially upward from the center of the upper disk, so that when the cutter is raised, the tapered drill means cuts open a hole in the liner; then as the cutter is raised farther the abrasive top face of the upper disk grinds away the liner and when the cutter is lowered the abrasive bottom face of the lower disk tears off the liner, and when the cutter is moved sideways, the abrasive side surface of the support plate grinds off the liner; consequently, it is possible to cut open a hole of various quasi-circular shapes such as ellipse, with ease and precision.

Also, according to the invention, the binder assembly (8, 9, 14) is provided to bind said tapered drill means, said upper and lower disks, and said support plate together and detachably and to fix said rotary cutter about an output shaft of a rotary drive means, so that when any of these parts gets worn out or broken, the cutter is simply disassembled and only the defective part is replaced by a brand-new one; consequently, there is no need of replacing the entire cutter with a new set and the economy of the operation cost is improved.

Furthermore, the cutter apparatus of the present invention is equipped with a cordless TV camera, so that there is no need of using a cord that is conventionally used to connect the TV camera to the monitoring TV receiver set; consequently, the operation is further rationalized.

The above and other objects and features of the invention will appear more fully hereinafter in the following description given in connection with the accompanying drawings and the novelty thereof pointed out in the appended claims.

DESCRIPTION OF THE INVENTION

Next, an embodiment of the invention will be described with reference to the attached drawings.

Figure 1:
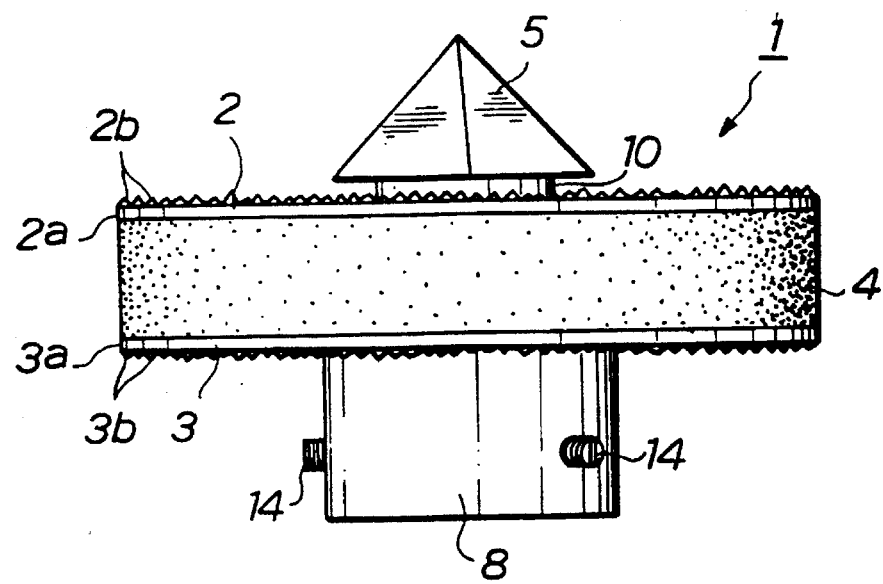
FIG. 1 is a side view of a cutter according to an embodiment of the invention.
Figure 2:
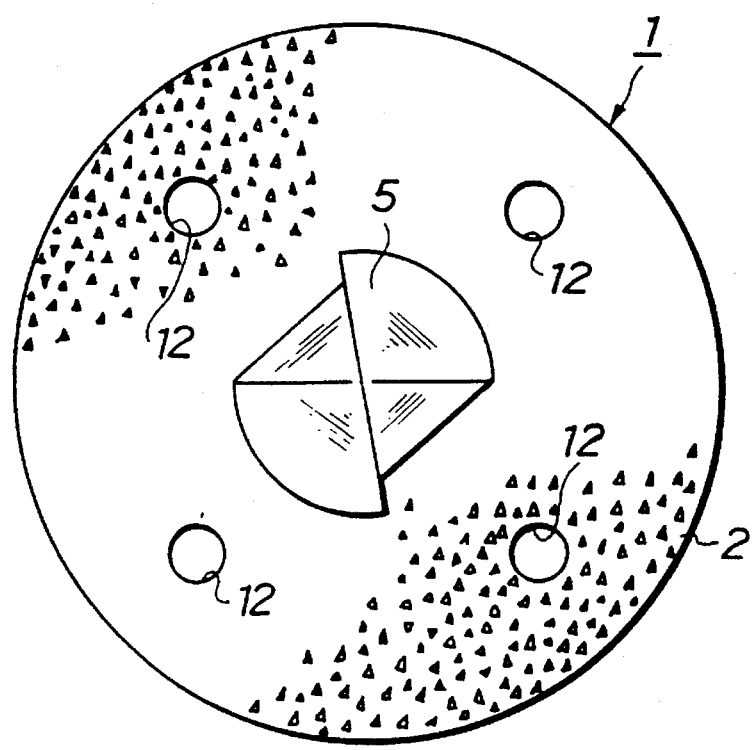
FIG. 2 is a top plan view of the same cutter of FIG. 1.

FIG. 1 is a side view of a cutter according to the invention; FIG. 2 is a top plan view of the same cutter; and FIG. 3 is a vertical cross section of the same cutter.

Figure 3:
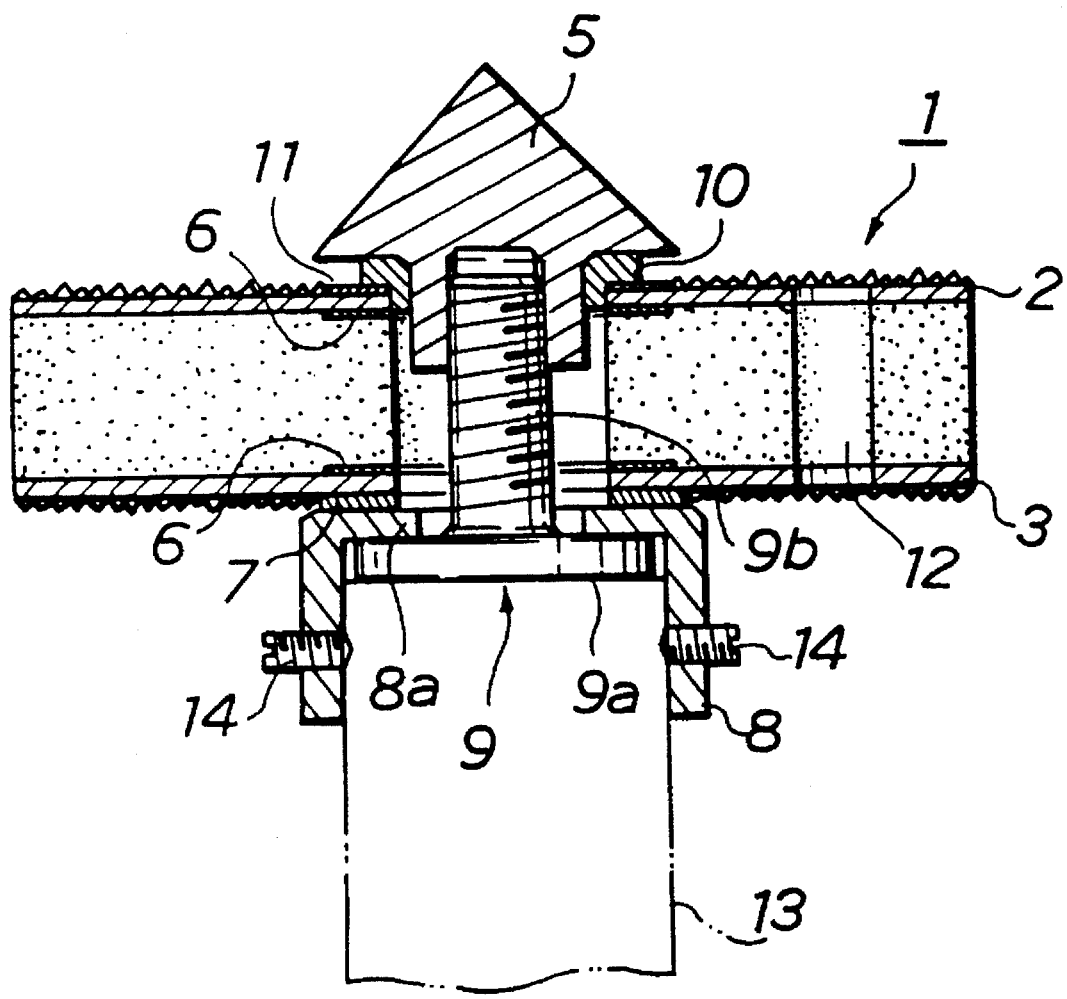
FIG. 3 is a vertical cross section of the same cutter.

With reference to FIG. 1, the cutter 1 of the present invention is basically constructed by sandwiching a disk-shaped support plate 4 between an upper sanding disk 2 and a lower sanding disk 3, which are arranged in axial direction (up and down in FIGS. 1 and 3). The sanding disks 2, 3 have their abrasive flat sides exposed and also the support plate 4 has the abrasive side surface exposed between the two sanding disks 2, 3. A tapered reamer 5 is provided to protrude from the center of the upper sanding disk 2. This reamer 5, the sanding disks 2, 3 and the support plate 4 are assembled such the they can be detached in the axial direction.

Incidentally, the sanding disks 2, 3 are composed of disks 2a, 3a made of paper or cloth with one face coated with abrasive material 2a, 3b, which are bonded onto said faces by means of a heat-resistive adhesive resin. The support plate 4 is composed of a grindstone, metal plate, cloth plate, etc. When the support plate 4 is composed of a metal plate or a cloth plate, its side face is bonded with an abrasive material.

As shown in FIG. 3, the support plate 4 is sandwiched between the upper and lower sanding disks 2, 3 with a packing or adhesive layer 6 provided inbetween. The lower face of the sanding disk 3 rests on the upper face of a cylindrical (cup-like) stationary member 8 with a packing or adhesive layer 7 provided inbetween.

Also, a bolt member 9 is screwed from below through the stationary member 8, and the head 9a of the bolt member 9 is stopped by the inward flange 8a of the stationary member 8, and the threaded shaft 9b of the bolt member 9 extends beyond the stationary member 8 to dispose itself in the central bore formed by the sanding disks 2, 3 and the support plate 4. This threaded shaft 9b of the bolt member 9 is threadably inserted in the bore formed in the bottom of the tapered reamer 5, and the roof of the reamer 5 is fixedly seated on the upper sanding disk 2 via a ring 10 and a packing or an adhesive layer 11 such that the upper part of the reamer 5 protrudes upward from the central bore of the sanding disk 2.

Incidentally, in this embodiment, the tapered reamer 5 is used, but it is possible to use a drill instead.

The cutter 1 of the present embodiment is assembled in the following manner: the tapered reamer 5 is screwed tightly about the threaded shaft 9b of the bolt 9 so that the sanding disks 2, 3 and the support plate 4 are pressed hard between the tapered reamer 5 and the stationary member 8. Thus, as the tapered reamer 5, the sanding disks 2, 3, the support plate 4 and the stationary member 8 are combined together, the cutter 1 is assembled. Incidentally, when the cutter 1 is assembled, the sanding disks 2, 3 and the support plate 4 are aligned in such a phase relation that a plurality of through bores 12 are formed parallel to the threaded shaft 9b, and these bores are for the cut powders to fall and escape.

The cutter 1 as constructed above is connected to the free end of the output shaft 13 of a drive source such as a motor, as shown in FIG. 3. In particular, the free end of the output shaft 13 is closely capped by the cup-like stationary member 8 and the latter 8 is fastened on the former 13 by means of a plurality of screws 14 so that as the output shaft 13 turns, the entire cutter 1 turns therewith and attains boring and cutting operation.

Next will be described an operation of cutting open the tubular liner by means of the cutter 1 of the present invention with reference to FIG. 4 through FIG. 10. Incidentally, FIGS. 4 through 10 are cross sectional views to show in sequence how the liner boring operation is conducted.

Figure 4:
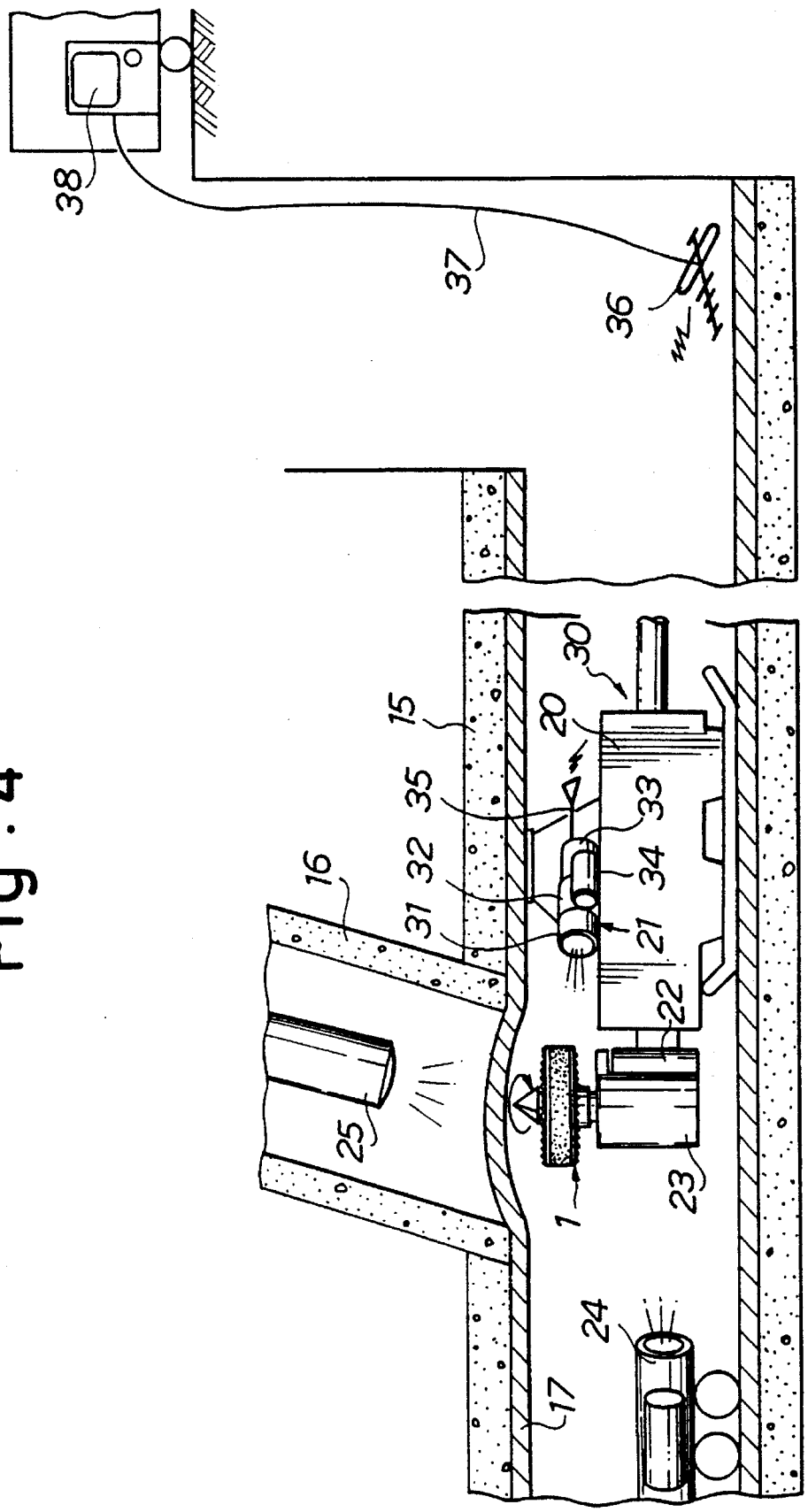
FIG. 4 is a vertical cross section of a site where a pipe lining operation is conducted, and shows a step of the cutting operation.

In FIG. 4, which schematically shows a site of the pipe repair operation, the reference numeral 15 designates an underground sewer pipe (hereinafter "main pipe"), which is already internally lined with a tubular liner 17 by the conventional lining method. The reference numeral 16 designates a branch pipe branching off the main pipe 15. At this moment, the liner 17 is closing the end of the branch-pipe 16, and, therefore, it is necessary to cut off that portion of the liner 17 which closes the end of the branch pipe 16 so as to allow the branch pipe 16 to communicate with the main pipe 15. This cutting operation is conducted by means of a cutter 1 of the present embodiment in the following manner.

With reference to FIG. 4, reference numeral 30 designates a cutter apparatus, already brought inside the main pipe 15. This cutter apparatus 30 comprises an on-the-sleigh robot 20, a cordless TV camera 21 installed on the back of the robot 20, a hydraulically-operated piston cylinder 22, and a hydraulically-operated motor 23. As described above, the cutter 1 is detachably locked about the end of the output shaft of the hydraulically-operated motor 23. Incidentally, as shown in FIG. 4, the cordless TV camera 21 is composed of a camera 31, a transmitter 32, a battery 33, a light 34, and an antenna 35. A video signal transmitted from the antenna 35 is received by another antenna 36 provided at an end of the main pipe 15, and sent to the TV receiver set 38 by way of a cord 37, whereupon the TV receiver set reproduces an image for the operator to monitor the operation in the main pipe 15. Although in the present embodiment the hydraulically-operated motor 23 is used as the drive source for the cutter 1, it is possible to use other kinds of drive sources such as a fluid motor energized by means of air pressure or water pressure, and an electric motor.

Incidentally, cordless TV cameras 24 and 25 are stationed in the main pipe 15 and the branch pipe 16, respectively, to look at and continuously take the pictures of the cutter 1 for the operator to monitor its operation from different angles.

Now, the position of the cutter apparatus 30 is adjusted until the center of the cutter 1 comes at about the middle of the the end port of the branch pipe 16, as shown in FIG. 4; then, the hydraulically-operated motor 23 is driven to spin the cutter 1 provided at the end of its output shaft.

Figure 5:
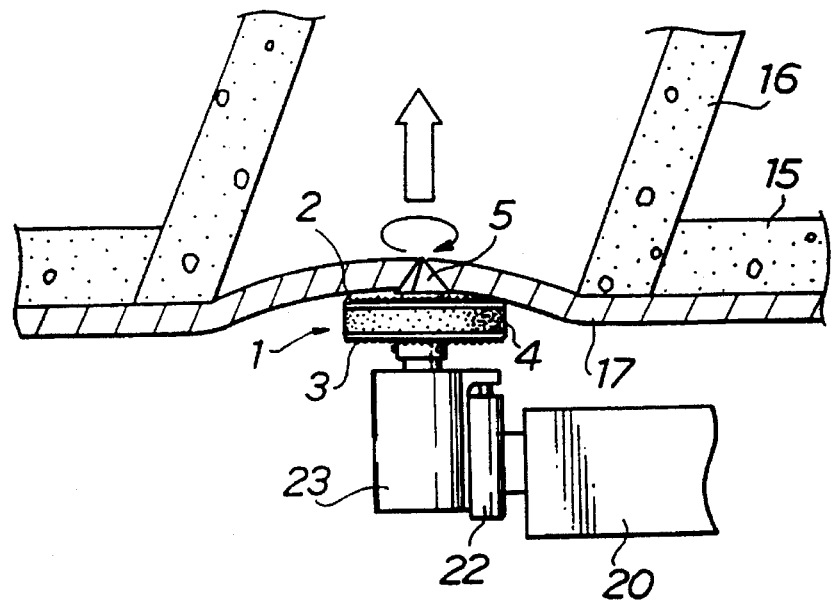
FIG. 5 is a vertical cross section showing a step of the cutting operation.
Figure 6:
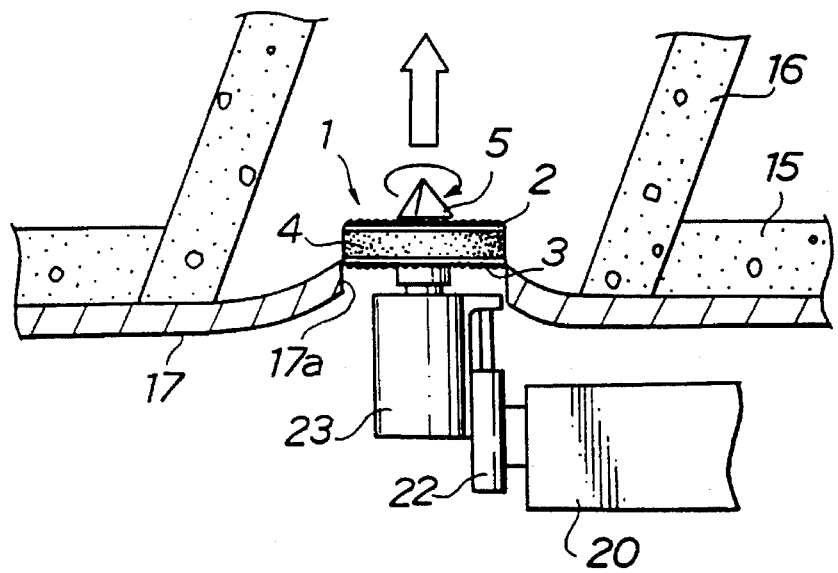
FIG. 6 is a vertical cross section similar as FIG. 5 to show a step of the cutting operation.

At this moment, the hydraulically-operated piston cylinder 22 is driven such that the hydraulically-operated motor 23 and the cutter 1 are raised together, and as the result, the tapered reamer 5 of the cutter 1 makes a small hole in the tubular liner 17, as shown in FIG. 5. Then, as the cutter 5 is further raised, the abrasive top-side face of the upper sanding disk 2 grinds through the thickness of the tubular liner 17, and as the result, there is made in the tubular liner 17 a hole 17a which has a diameter equal to that of the sanding disk 2, as shown in FIG. 6.

Figure 7:
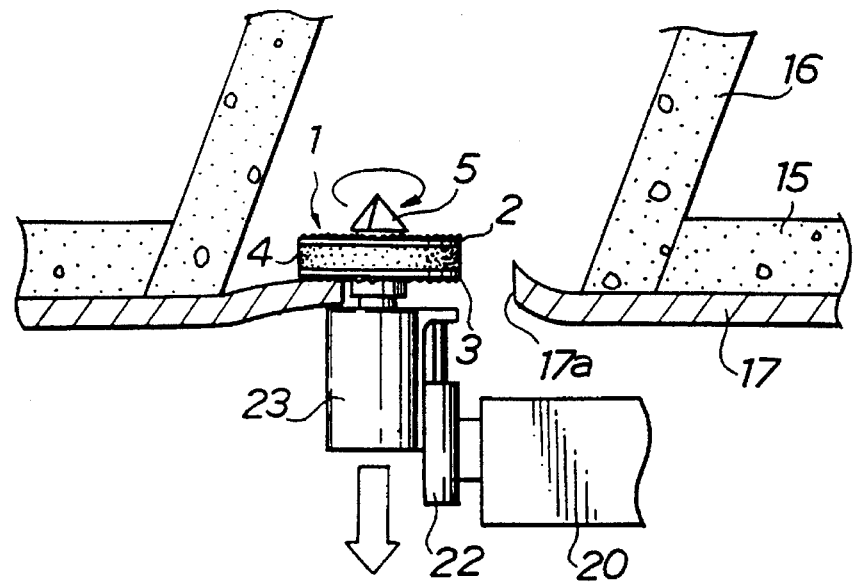
FIG. 7 is a vertical cross section similar as FIG. 5 to show a step of the cutting operation.
Figure 8:
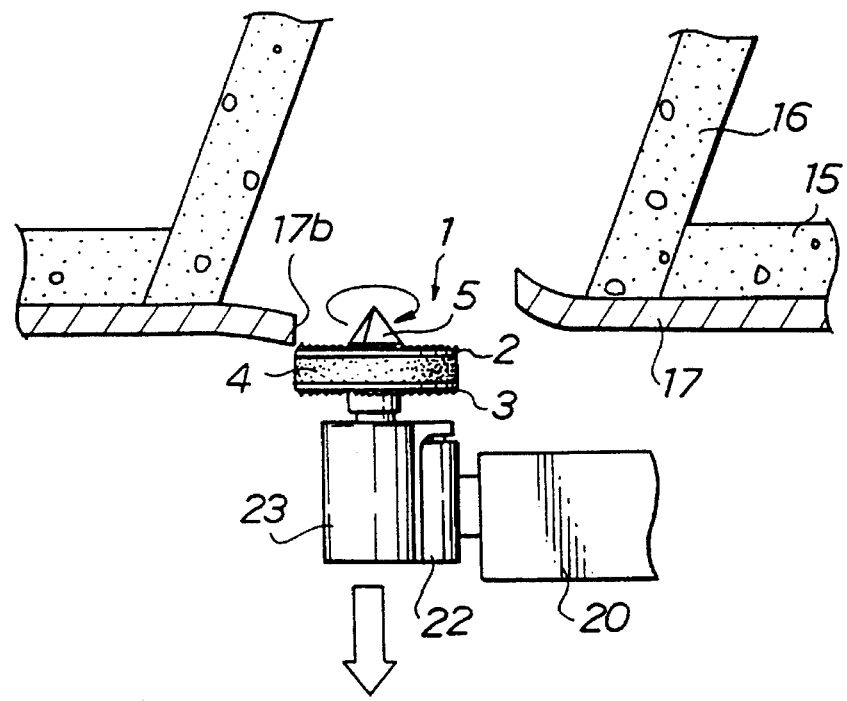
FIG. 8 is a vertical cross section similar as FIG. 5 to show a step of the cutting operation.

Next, the robot 20 is moved such that the cutter 1 is shifted leftward, as viewed in FIG. 7, then the hydraulically-operated piston cylinder 22 is driven to lower the cutter 1, whereupon the abrasive bottom-side face of the lower sanding disk 3 grinds through the thickness of the tubular liner 17, and as the result, there is made a bigger hole 17b in the tubular liner 17, as shown in FIG. 8. Incidentally, the cut powder created as the cutter 1 cuts the tubular liner 17 is dropped through the through bores 12 made in the cutter 1 so that the cut powder is not liable to reduce the cutting efficiency of the cutter 1.

Figure 9:
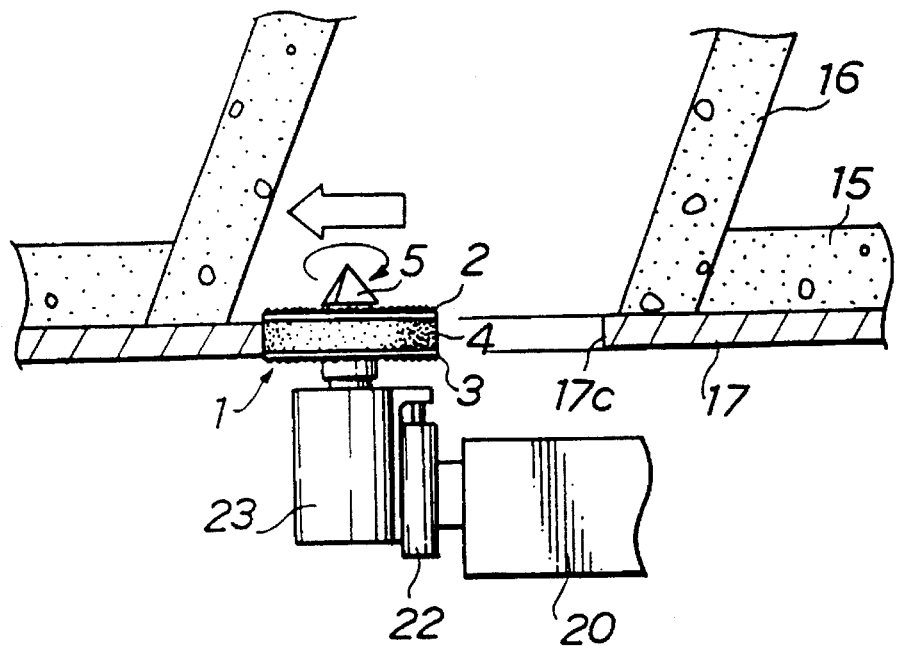
FIG. 9 is a vertical cross section similar as FIG. 5 to show a step of the cutting operation.

As this vertical and sideward movement of the cutter 1 is repeated, a hole is cut open in the tubular liner 17 by the upper and lower sanding disks 2 and 3 alternately, and the remnant burrs are removed as they are ground by the abrasive side surface of the support plate 4 of the cutter 1, as shown in FIG. 9.

Figure 10:
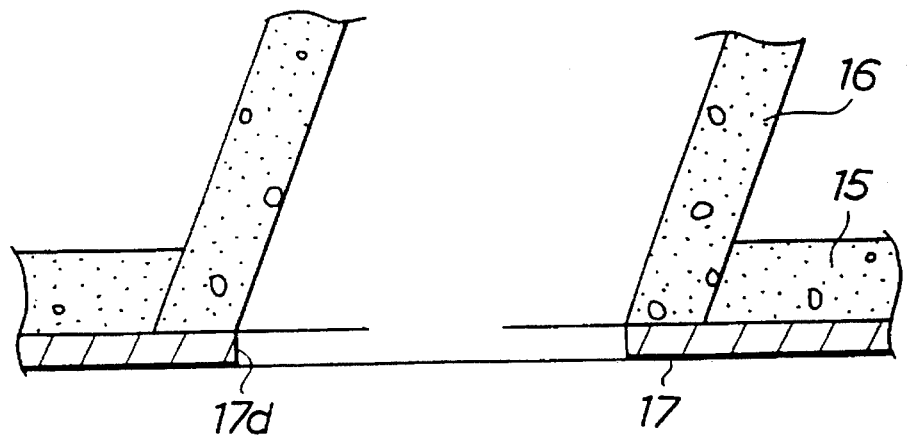
FIG. 10 is a vertical cross section similar as FIG. 5 when the cutting operation is completed.

More particularly, with reference to FIG. 9, the side surface of the support plate 4 of the cutter 1 is pressed against the cut face of the tubular liner 17 (inner periphery of the hole 17c) and moved laterally (forward, backward, and sideways) until all the burrs of the tubular liner 17 are ground off by the side surface of the support plate 4; as the result, a hole (ellipse) 17d is made in the tubular liner 17 which is congruent and coincident with the end hole of the branch pipe 16, as shown in FIG. 10. Thus, the branch pipe 16 communicates with the main pipe 15 via this hole 17d.

As described above, in the present embodiment, first the tubular liner 17 is punctured by the tapered reamer 5, and then the vertical cutting of the tubular liner 17 is conducted by the sanding disks 2, 3, and the lateral (forward, backward, and sideways) cutting is conducted by the peripheral surface of the support plate 4, so that it is possible for the cutter 1 to cut off a quasi-circular holes such as the oval hole 17d with ease and precision, and the branch pipe can communicate with the main pipe 15 without obstacle.

Also, the cutter 1 of the present invention is detachably equipped with the tapered reamer 5, the sanding disks 2, 3 and the support plate 4, so that when any of these items gets too worn out to continue its normal performance, instead of replacing the entire cutter 1 with a new set, one can only disassemble the cutter 1 and replace the worn out item by a brand-new one, and this improves the operation economy.

Furthermore, since the cutter apparatus 30 is equipped with the cordless TV camera 21, there is no need of connecting the camera 21 to the monitoring TV receiver set 38 with a cord and thus the problem of the cord getting in the way of the cutter apparatus 30 is solved, too.

Figure 11:
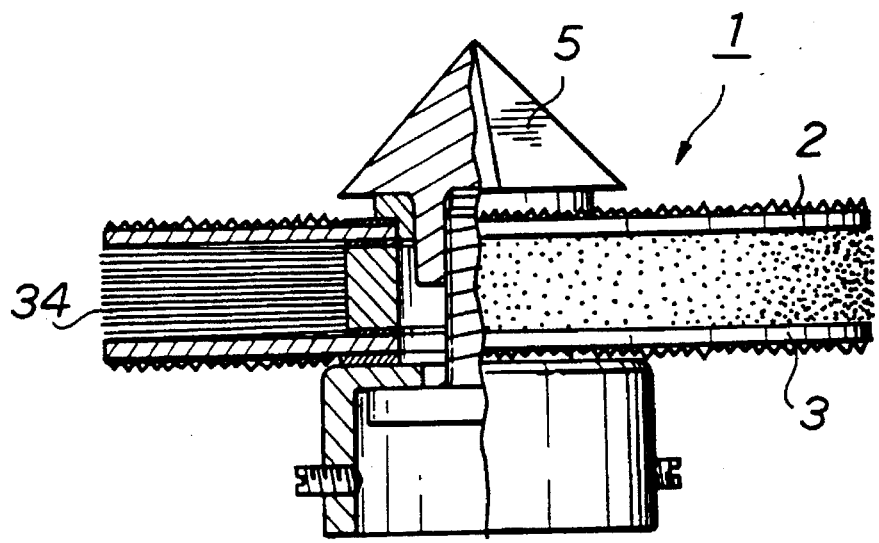
FIG. 11 is a partial cross section of a cutter of another embodiment.
Figure 12:
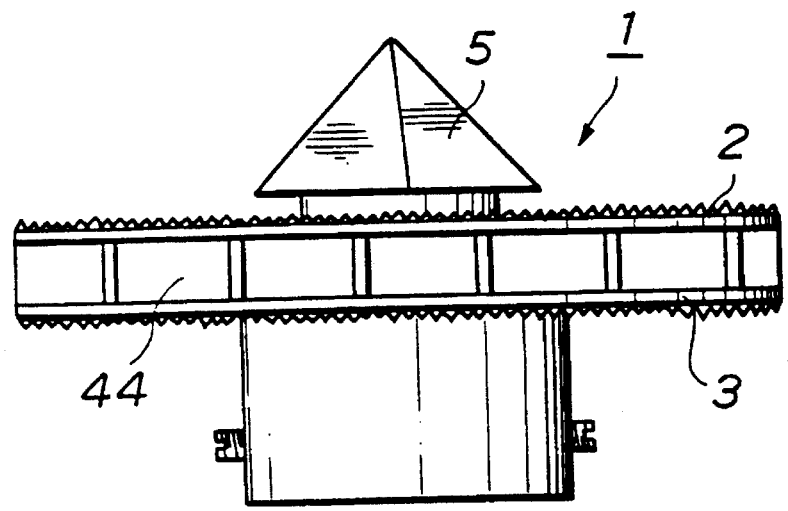
FIG. 12 is aside view of a cutter of still another embodiment.
Figure 13:
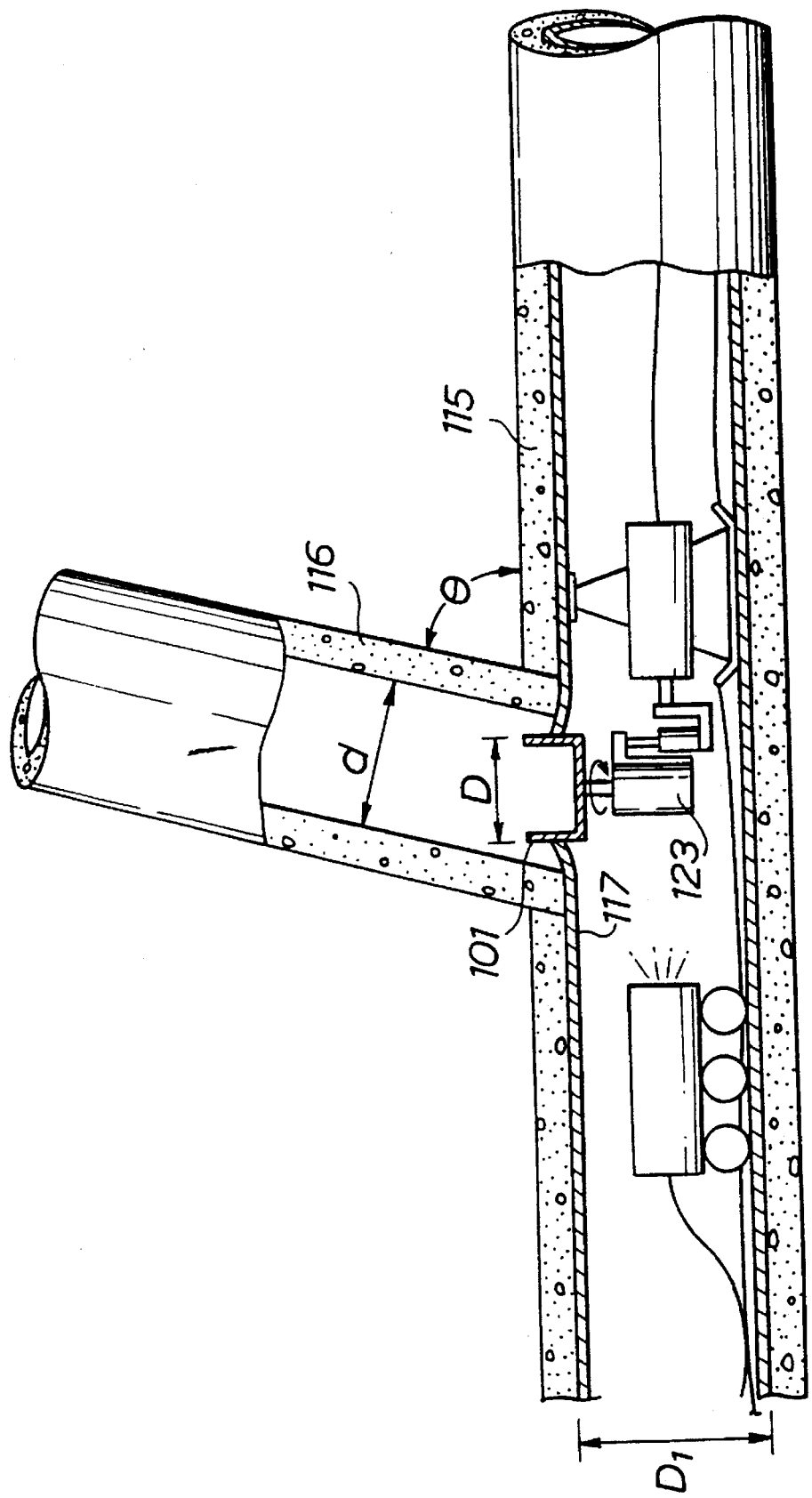
FIG. 13 is a cross section of a site to show how a conventional hole saw type cutter cuts open a liner.
Figure 14:
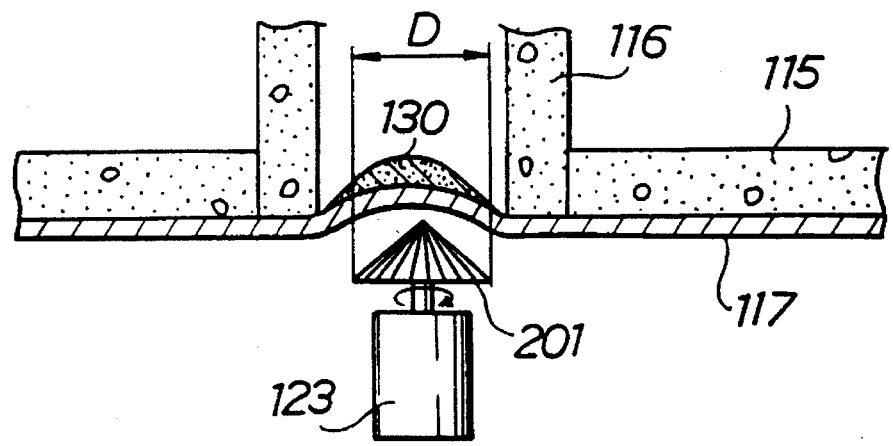
FIG. 14 as a cross section of a site to show how a conventional tapered type cutter cuts open a liner.
Figure 15:
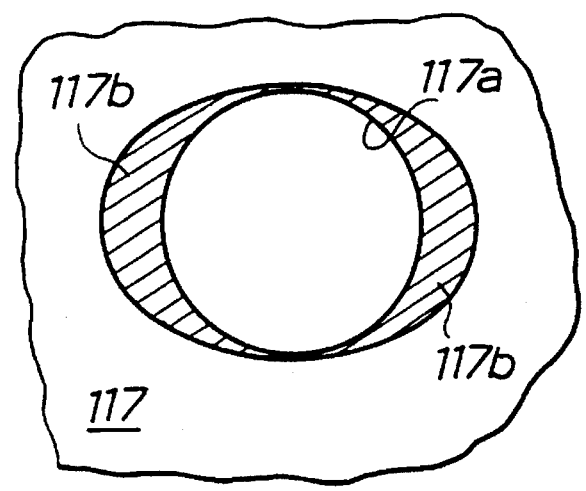
FIG. 15 is top plan view to show the relative configurations of a hole made in the liner and the opening of the branch pipe.
Figure 16:
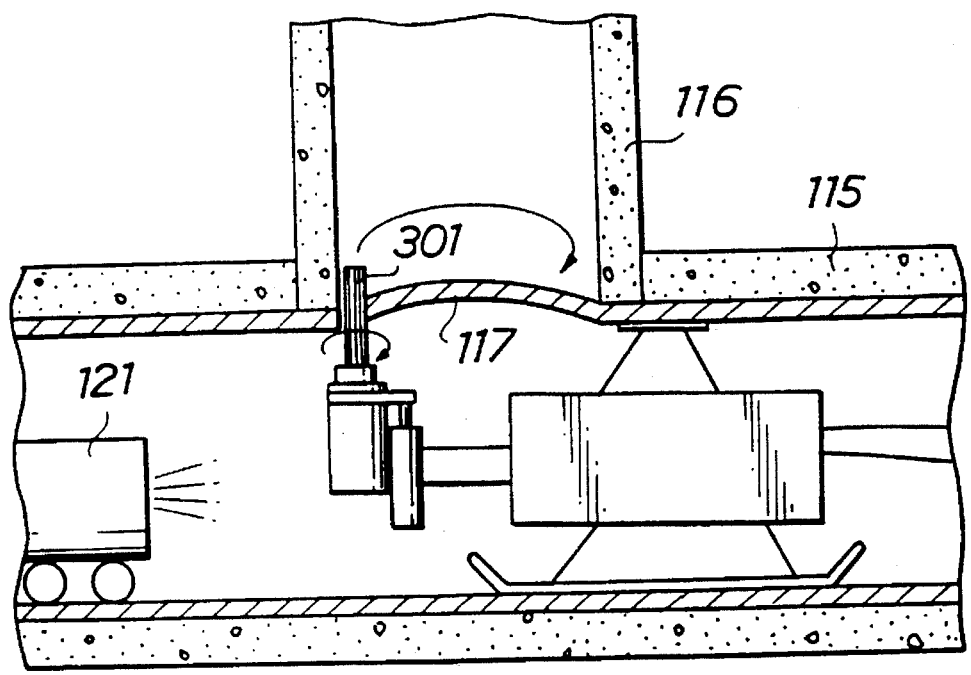
FIG. 16 is a cross section of a site to show how a conventional thin rod-shaped rotary cutter cuts open a liner.
Figure 17:
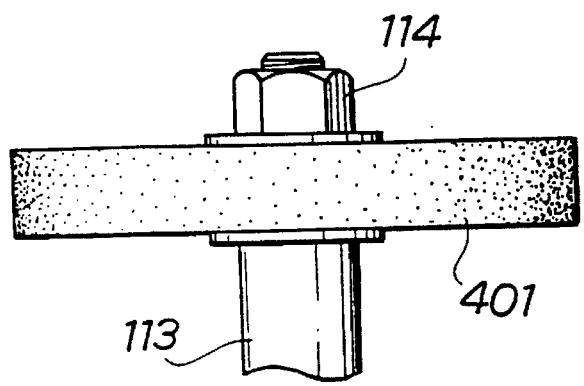
FIG. 17 is a side view of a disc-shaped grindstone cutter.

Incidentally, in the above description, the support plate 4 is made of either grindstone, metal plate, or cloth plate, but it is also possible to adopt a wire brush 44, as shown in FIG. 11, or a diamond grate 54, as shown in FIG. 12.

Also, the cutter of the present invention can be useful not only for a hole opening of a tubular liner, but also for severing of protruding branch pipe, removal of mortar, and severing of packing in a pipe of a diameter 200 mm–600 mm where a man cannot enter, and for cutting of tree roots.

(Result of the Invention)

As is clear from the above explanation, according to the invention, the tapered reamer 5 extends axially upward from the center of the upper sanding disk 2, so that when the cutter 1 is raised, the tapered reamer 5 cuts open a hole in the liner 17; then as the cutter 1 is raised farther the abrasive top face of the upper sanding disk 2 grinds away the liner 17 and when the cutter 1 is lowered the abrasive bottom face of the lower sanding disk 3 tears off the liner 17, and when the cutter 1 is moved sideways, the abrasive side surface of the support plate 4 grinds off the liner 17; consequently, it is possible to cut open a hole of various quasi-circular shapes such as ellipse, with ease and precision.

Also, according to the invention, the binder assembly (8, 9, 14) is provided to bind the tapered reamer 5, the upper and lower sanding disks 2, 3, and the support plate 4 together and detachably, so that when any of these parts gets worn out or broken, the cutter 1 is simply disassembled and only the defective part is replaced by a brand-new one; consequently, there is no need of replacing the entire cutter 1 with a new set and the economy of the operation cost is improved.

Furthermore, the cutter apparatus 30 of the present invention is equipped with a cordless TV camera 21, so that there is no need of using a cord that is conventionally used to connect the TV camera to the monitoring TV receiver set; consequently, the operation is further rationalized.

While the invention has been described in its preferred embodiments, it is to be understood that modifications will occur to those skilled in the art without departing from the spirit of the invention. For instance, the thermosetting resin may be replaced by another hardenable resin such as photosetting resin. The scope of the invention is therefore to be determined solely by the appended claims.

What is claimed is:

1. A rotary cutter having a central axis of rotation and comprising: a disk-shaped support plate having an abrasive peripheral surface of rotation parallel to the central axis; upper and lower parallel disks arranged in a row in axial direction to sandwich said support plate therebetween and whose exposed faces, respectively, are abrasive; a tapered drill means extending axially upward from the center of the upper disk; and a binder assembly to bind said tapered drill means, said upper and lower disks, and said support plate together and detachably and to fix said rotary cutter about an output shaft of a rotary drive means detachably.

2. The rotary cutter as recited in claim 1 wherein said upper and lower disks are circular sanding sheets with said exposed abrasive faces coated with abrasive material.

3. The rotary cutter as recited in claim 1 wherein said tapered drill means is a reamer.

4. The rotary cutter as recited in claim 1 wherein said support plate is formed of wire brush.

5. The rotary cutter as recited in claim 1 wherein said support plate is formed of diamond grate.

6. The rotary cutter as recited in claim 1 wherein said support plate is formed of metal plate.

7. The rotary cutter as recited in claim 1 wherein said support plate is formed of cloth plate.

8. The rotary cutter as recited in claim 1 wherein a plurality of through bores are formed through the disk-shaped support plate and the upper and lower disks in the axial direction for the cut powders to fall and escape through.

9. A cutter apparatus comprising: an on-the-sleigh robot; a drive means having a vertical output shaft and capable of shifting vertically relative to said robot; a rotary cutter detachably connected at the end of said output shaft of the drive means; and a cordless TV camera installed on said robot; said rotary cutter having a vertical central axis of rotation and comprising a disk-shaped support plate having an abrasive peripheral surface of rotation parallel to the central axis, upper and lower parallel disks arranged in a row in axial direction to sandwich said support plate therebetween and whose exposed faces, respectively, are abrasive, a tapered drill means extending axially upward from the center of the upper disk, and a binder assembly to bind said tapered drill means, said upper and lower disks, and said support plate together and detachably and to fix said rotary cutter about an output shaft of said rotary drive means also detachably.

10. The cutter apparatus as recited in claim 9 wherein said cordless TV cameras includes a camera, transmitter, a light, a battery, and antenna.

* * * * *